United States Patent
Maezawa et al.

(10) Patent No.: US 6,992,305 B2
(45) Date of Patent: Jan. 31, 2006

(54) RADIATION IMAGE CONVERTING PANEL AND PRODUCTION METHOD OF THE SAME

(75) Inventors: Akihiro Maezawa, Hino (JP); Noriyuki Mishina, Ome (JP)

(73) Assignee: Konica Corporation, Tokyo (JP)

( * ) Notice: Subject to any disclaimer, the term of this patent is extended or adjusted under 35 U.S.C. 154(b) by 278 days.

(21) Appl. No.: 10/424,418

(22) Filed: Apr. 28, 2003

(65) Prior Publication Data

US 2003/0209675 A1 Nov. 13, 2003

(30) Foreign Application Priority Data

May 8, 2002 (JP) .............................. 2002-132633
Aug. 29, 2002 (JP) .............................. 2002-250500

(51) Int. Cl.
*G03B 42/08* (2006.01)
(52) U.S. Cl. ...................... 250/484.4; 250/584; 427/65
(58) Field of Classification Search ............. 250/484.4, 250/584; 427/65
See application file for complete search history.

(56) References Cited

U.S. PATENT DOCUMENTS

| | | | | |
|---|---|---|---|---|
| 5,904,995 A | * | 5/1999 | Maezawa et al. | 428/690 |
| 6,228,286 B1 | * | 5/2001 | Leblans et al. | 252/301.4 H |
| 2003/0034458 A1 | * | 2/2003 | Isoda et al. | 250/484.4 |
| 2005/0031799 A1 | * | 2/2005 | Matsumoto et al. | 427/593 |

OTHER PUBLICATIONS

Keller et al, Studies on Some Infrared Stimulable Phosphors, Nov. 1, 1957, vol. 108, pp. 663-676.*

* cited by examiner

*Primary Examiner*—David Porta
*Assistant Examiner*—Christine Sung
(74) *Attorney, Agent, or Firm*—Lucas & Mercanti LLP (57) ABSTRACT

A radiation image converging panel comprising a support having thereon a stimulable phosphor layer produced by a vapor phase method so as to have a thickness of 50 $\mu$m to 10 mm, wherein the stimulable phosphor layer comprises:(i) a stimulable phosphor; and (ii) an alkaline metal compound or an alkaline earth metal compound each having a different crystal structure from the stimulable phosphor, and an amount of the alkaline metal compound or the alkaline earth metal compound being 10 to 1000 ppm by weight based on the total weight of the stimulable phosphor layer.

8 Claims, 2 Drawing Sheets

RADIATION IMAGE CONVERTING PANEL AND PRODUCTION METHOD OF THE SAME

TECHNICAL FIELD

The present invention relates to a radiation image (or referred to as a radiological image) converting panel and a production method of the same.

BACKGROUND

Heretofore, to obtain radiation images, a so-called radiographic method has been employed. However, a method has been developed in which radiation images are visualized without using silver salts. Namely, the following method is disclosed. Radiation which has passed through an object is absorbed by a phosphor. Subsequently, the phosphor is excited utilizing a certain type of energy, and radiation energy which is stored in the phosphor is allowed to be emitted as fluorescence which is detected to form images.

Known as a specific method is a radiation image converting method in which a panel comprising a support having thereon a stimulable phosphor layer is employed and either visible light or infrared radiation, or both, are employed (refer to U.S. Pat. No. 3,859,527).

Developed as radiation image converting methods employing high luminance and high speed stimulable phosphors are, for example, a radiation image converting method using BaFX:Eu$^{2+}$ (wherein X is Cl, Br, or I) based phosphors described in Japanese Patent Application Open to Public Inspection No. 59-75200 and a radiation image converting method using alkali halide phosphors described in Japanese Patent Application Open to Public Inspection No. 61-72087. Further, developed are alkali halide phosphors containing metals such as Tl$^+$, Ce$^{3+}$, Sm$^{3+}$, Eu$^{3+}$, Y$^{3+}$, Ag$^+$, Mg$^{2+}$, Pb$^{2+}$, and In$^{3+}$ as described in Japanese Patent Application Open to Public Inspection Nos. 61-73786 and 61-73787.

Further, in recent years, in analysis of diagnostic images, a radiation image converting panel with higher sharpness is still being sought. As a means to enhance sharpness, a trial has been made in which for example, the shape of a stimulable phosphor itself is controlled to enhance speed as well as sharpness.

One method in such trails includes, for example, a method in which a stimulable phosphor layer comprised of minute pseudo-columnar blocks, described in Japanese Patent Application Open to Public Inspection No. 61-142497, is employed which is formed by accumulating a stimulable phosphor onto a support having a fine uneven pattern.

Further, proposed methods include a method to use a radiation image converting panel having a stimulable phosphor layer, in which, as described in Japanese Patent Application Open to Public Inspection No. 61-142500, cracks between columnar blocks, which are prepared by accumulating a stimulable phosphor on a support having a fine pattern, are subjected to a shock treatment so that the aforesaid cracks are allowed to grow and further, a method to use a radiation image converting panel in which, as described in Japanese Patent Application Open to Public Inspection No. 62-39737, a stimulable phosphor layer formed on a support is subjected to formation of cracks on the surface side to be pseudo-columnar, and further, a method in which, as described in Japanese Patent Application Open to Public Inspection No. 62-110200, a stimulable phosphor layer having voids is formed on a support, employing vacuum evaporation, and subsequently voids are allowed to grow by a thermal treatment so that cracks are provided.

Still further, Japanese Patent Application Open to Public Inspection No. 2-58000 describes a radiation image converting panel having a stimulable phosphor layer in which thin and long columnar crystals, having a definite slope with respect to the normal direction of a support, are formed on the aforesaid support, using a vapor phase growth method (being a vapor phase sedimentation method).

These methods which control the shape of the stimulable phosphor layer are characterized in that in all cases, by allowing the stimulable phosphor layer to be columnar, it is possible to minimize diffusion of stimulating light or stimulated luminescence in the lateral direction (namely, light reaches the support surface after being repeatedly reflected on the interface of cracks, i.e., columnar crystals), whereby it is possible to markedly enhance image sharpness.

Recently, a radiation image converting panel has been proposed in which alkali halide, such as CsBr, is incorporated as a host and Eu is used as an activator.

Particularly, by employing Eu as an activator, it has become possible to achieve enhancement of X-ray conversion efficiency, which has been considered to be impossible.

However, Eu exhibits markedly high thermal diffusion as well as high vapor pressure under vacuum, whereby problems occurred in which Eu was unevenly distributed in the host due to ease of scattering in the host. As a result, it has been difficult to achieve high X-ray conversion efficiency through activation employing activators, and thus commercial viability has not been realized.

Further, in techniques in which activation is carried out employing rare earth atoms such as Eu, it has been difficult to uniformly distribute the desired activator only by controlling its vapor pressure characteristics during formation of a vacuum evaporated layer.

Specifically, when a stimulable phosphor layer is prepared employing the aforesaid vapor phase method (sedimentation), application of several thermal processes such as heating of raw materials, heating of the support during vacuum evaporation, and annealing after the layer formation (relaxation of distortion of the substrate) cause non-uniform distribution of activators.

However, all these heating processes have been essentially required to provide durability to the stimulable phosphor layer.

Accordingly, improvements in luminance, sharpness, as well as uniform distribution of activators of the radiation image converting panel have been sought on the market.

Moreover, in crystals in which alkali halide is used as a main component, when a composition is varied to increase X-ray absorption, distortion of phosphor crystals increases. As a result, even though high luminance is exhibited due to the presence of many emission levels, emission distribution in terms of emission wavelengths is broadened, resulting in broad emission. The resulting broad emission is markedly affected when Eu is employed as the activator. As a result, even though resulting in high luminance, delayed luminescence-response is degraded due to distribution broadening at emission levels.

When alkali halide is used in a CR detector as a radiation image capturing system, problems of the aforesaid delayed luminescence characteristics are pronounced. Specifically, in the radiation image capturing system, problems occur in which it is necessary to carry out reading a definite time till reading after X-ray exposure, and with regard to effects of photostimulated delayed luminescence, contrast during reading is degraded depending on the delayed luminescence. In addition, it was found that the reading rate (being a reading cycle or use frequency) was adversely affected.

Accordingly, enhancement in luminance as well as sharpness of the radiation image conversion panel and improvement of delayed luminescence characteristics (instantaneously emitted delayed-luminescence as well as photostimulated delayed luminescence), which matches an increase in processing rate, are continuously demanded on the market.

SUMMARY

An object of the present invention is to provide a radiation image converting panel in which activators in a stimulable phosphor layer (hereinafter occasionally referred to as a phosphor layer) are uniformly distributed, and in addition, which exhibits high luminance well as high sharpness, and a production method of the aforesaid radiation image converting panel.

Another object of the present invention is to provide a radiation image conversion panel which exhibits excellent contrast due to less delayed luminescence (instantaneously emitted delayed-luminescence and photostimulated delayed-luminescence), and also exhibit high luminance as well as high sharpness, and a product method of the same.

The aforesaid object of the present invention is achieved employing the embodiments described below.

(1) A radiation image converting panel comprising a support having thereon a stimulable phosphor layer produced by a vapor phase method so as to have a thickness of 50 μm to 10 mm,
  wherein the stimulable phosphor layer comprises:
  (i) a stimulable phosphor; and
  (ii) an alkaline metal compound or an alkaline earth metal compound each having a different crystal structure from the stimulable phosphor, and an amount of the alkaline metal compound or the alkaline earth metal compound being 10 to 1000 ppm by weight based on the total weight of the stimulable phosphor layer.

The above-mentioned "a different crystal structure from the stimulable phosphor" means "a crystal structure other than that of CsCl" and an example of "a different crystal structure" is a crystal structure of NaCl.

(2) The radiation image converting panel of item 1,
  wherein the stimulable phosphor is represented by Formula (1):

Formula (1)

(3) The radiation image converting panel of item 1,
  wherein the stimulable phosphor comprises further a fusing agent in an amount of 10 to 1000 ppm by weight based on the total weight of the stimulable phosphor.

(4) The radiation image converting panel of item 1,
  wherein a protective layer is provided on the stimulable phosphor layer under an atmospheric pressure.

(5) A radiation image converting panel comprising a support having thereon a stimulable phosphor layer produced by a vapor phase method so as to have a thickness of 50 μm to 1 mm,
  wherein the stimulable phosphor layer comprises a stimulable phosphor comprising at least two kinds of rare earth compounds each having a different rare earth element, and the rare earth compounds being uniformly present in the stimulable phosphor layer.

(6) The radiation image converting panel of item 5,
  wherein the stimulable phosphor is represented by Formula (1):

Formula (1)

(7) The radiation image converting panel of item 5,
  wherein one of the two kinds of rare earth compounds comprises a Cs atom.

(8) The radiation image converting panel of item 5,
  wherein a photostimulated delayed luminance ratio defined by Eb/Ea is 0.0001 to 0.1%:
  (i) Ea being a luminance of a photostimulated emission from the radiation image converting panel after being irradiated with X ray and subsequently being stimulated with a laser; and
  (ii) Eb being a luminance of the stimulated delayed emission from the radiation image converting panel at 300 msec after suspension of stimulation with the laser.

(9) The radiation image converting panel of item 5,
  wherein an instantaneous delayed luminance ratio defined by E1/E0 is 0.0001 to 0.1%:
  (i) E0 being a luminance of an emission from the radiation image converting panel at the moment of being irradiated with X ray; and
  (ii) E1 being a luminance of an emission from the radiation image converting panel at 300 msec after suspension of irradiation with X ray.

(10) A method for preparing the radiation image converting panel of item 5, comprising a step of producing the stimulable phosphor in a dry air condition.

DESCRIPTION OF THE PREFERRED EMBODIMENTS

The present invention will now be more detailed.

The present invention is characterized in that a radiation image converting panel in which it is possible to uniformly distribute activators as a main component in the phosphor layer, and which exhibits high luminance as well as high sharpness, is prepared by forming the phosphor layer to have a layer thickness of 50 μm to 10 mm, employing a vapor phase method, and by incorporating in the phosphor layer alkaline metal and alkaline earth metal compounds (hereinafter occasionally referred to as impurities), in a ratio of 10 to 1,000 ppm, which are different from the stimulable phosphor in the phosphor layer, as a main component.

Impurities, as described herein, refer to, for example, compounds (such as KBr) described below as well as activators differing from the main component.

In order to incorporate in the phosphor layer alkaline metal and alkaline earth metal compounds which are different from the stimulable phosphors as a main component, it is possible to add fluxes to raw materials of stimulable phosphors. In more detail, by incorporating the aforesaid fluxes in the raw materials of phosphors, materials (such as CsBr having a melting point of 645° C. when Eu is vacuum evaporated, and $EuBr_2$ having a melting point of 671° C.), which have different melting points, are easily melted realizing the eutectic point. Thus, by carrying out vacuum evaporation using the melted raw materials of phosphors, it is possible to uniformly distribute activators as the main component in the phosphor layer. As a result, it is assumed that it is possible to improve phosphor characteristics (such as luminance and sharpness).

Realization of the eutectic point refers to melting of materials having different melting points or forming of a solid solution. Materials used for such realization are called fluxes. The invention of claim 3 is characterized in that the aforesaid fluxes are added to the raw materials of phosphors.

Namely, in the present invention, listed as fluxes incorporated in the raw materials of phosphors are, for example, RbBr, KBr, NaBr, $BaBr_2$, $SrBr_2$, $CaBr_2$, and $MgBr_2$, and in addition, chlorides, iodides, carbonates, and sulfates of the aforesaid positive ions.

By adding the aforesaid fluxes to the raw materials of phosphors, incorporated in the phosphor layer are alkaline metal and alkaline earth metal compounds which are different from the aforesaid phosphors as the main component.

The aforesaid fluxes are preferably incorporated in the raw materials of phosphors in a ratio of 1 to 1,000 ppm.

Listed as the aforesaid impurities are, for example, RbCl, KBr, $NH_4Br$, RbBr, $RbCOO^-$, and $RbSO_3^-$. It is possible to determine the incorporated amount by analyzing the phosphor scraped from the phosphor layer, employing an ICP method.

Uniformly distributing the aforesaid activators as a main component in the phosphor layer, as described herein, means that the content of said activators in the phosphor layer in contact with the support side is the same as that on the surface of the aforesaid phosphor layer.

Specifically, the difference in contents of the aforesaid activators between the phosphor layer in contact with the support and the phosphor layer surface is within ±10 percent. A confirming method is as follows: When an approximately 500 μm thick phosphor layer is formed, an approximately 100 μm thick sample is scraped from the surface of the phosphor layer. On the other hand, a sample having a 100 μm thick phosphor layer on the support is obtained. Each phosphor layer is dissolved in pure water to prepare an aqueous solution. The amount of the activators is then determined by analyzing the resulting aqueous solution employing an ICP.

One of the embodiments of the present is a production method of a radiation image converting panel which is characterized in that a process to provide a protective layer on the aforesaid stimulable phosphor layer is carried out under atmospheric pressure. However, it is not preferable to form a protective layer under reduced pressure on the phosphor layer comprising alkaline metal and alkaline earth metal compounds in a ratio of several hundred ppm which are different from the aforesaid stimulable phosphors as a main component. Because reactivity with gases is enhanced to form colored substances, thereby the yield of radiation image converting panels resulting in a decrease.

Another embodiment of the present invention is characterized in that at least one stimulable phosphor layer is formed on a support so as to have a layer thickness of 50 μm to 1 mm, employing a vapor phase method (also called a vapor phase sedimentation method), and at least two types of rare earth compounds are uniformly incorporated in the phosphor composition.

"Uniformly incorporated", as described herein, means that the amount of activators in the phosphor layer on the support side and on the phosphor surface side is the same as each other.

Specifically, any difference between the amounts of activators on the support side and on the surface side of the phosphor layer is to be within ±10 percent. It is possible to confirm such difference employing the following method. The surface of the phosphor layer formed at a thickness of approximately 500 μm is scraped to prepare an approximately 100 μm thick sample, while a sample is prepared in which a phosphor layer on the support side has a thickness of 100 μm. Each sample is dissolved in water to prepare an aqueous solution. Subsequently it is possible to determine the amount of the activators by analyzing the resulting solution, using ICP.

In the present invention, at least two types of rare earth compounds are occasionally incorporated in a phosphor composition. For example, when three types of rare earth compounds are incorporated, three types of phosphor activators are available. In such a case, herein, these are designated as a primary phosphor activator, secondary phosphor activator 1 and secondary phosphor activator 2.

The primary phosphor activator (hereinafter also referred to as the primary activator), secondary phosphor activator 1 (hereinafter also referred to as secondary activator 1), and secondary phosphor activator 2 (hereinafter also referred to as secondary activator 2) will now be described.

1) Secondary Phosphor Activator 1

When secondary activator 1 Gd is added as a diffusion inhibitor for primary activator Eu, the presence of Gd retards the thermal diffusion rate of primary activator Eu, whereby it is possible to minimize localization of primary activator Eu in the phosphor crystal after forming the vacuum-evaporated layer, as well as its release from the vacuum-evaporated layer whereby it is possible to stabilize the emission distribution.

The used amount of Eu is customarily $5 \times 10^{-4}$ g, and may be in the range of $5 \times 10^{-2}$ to $5 \times 10^{-5}$.

The used amount of Gd is customarily $5 \times 10^{-5}$ g, and may be in the range of $5 \times 10^{-2}$ to $5 \times 10^{-5}$.

2) Secondary Phosphor Activator 2

When secondary activator 2 Ce is added as a level stabilizer of primary activator Eu, the presence of Ce increases the stability of the phosphor crystals due to lattice defects formed by the introduction of primary activator Eu to the phosphor crystal. As a result, even though primary activator Eu is localized, the resulting emission distribution is narrowed resulting in a narrow emission.

3) Vacuum Evaporation Method

In the formation of a vacuum-evaporated layer using vapor phase sedimentation, the melting point of a phosphor raw material decreases due to impurities (including activators) added to phosphor host crystal CsBr.

Specifically, when the melting point of the phosphor raw material (CsBr:Eu,), which is prepared by adding primary activator Eu to phosphor host crystal CsBr, is lowered and thermal vacuum evaporation is then carried out, the following occurs. During formation of a vacuum evaporated layer, volatilization starts gradually from CsBr (having a melting point of approximately 645° C.) having a lower melting point and the introduction amount Eu decreases which should be introduced into the vacuum-evaporated layer as a primary activator. In addition, Eu is introduced into the crystal lattice (being a lattice defect) of CsBr crystal. As a result, the shape of the resulting columnar crystals is deformed to result in light scattering in the columnar crystal, whereby a decrease in sharpness is caused when subjected to laser excitation.

Accordingly, during vacuum evaporation of CsBr, primary activator Eu is introduced in the following manner. For example, when vacuum evaporation is carried out using a phosphor raw material comprised of a mixture of CsBr and $EuBr_2$, a vacuum-evaporated layer is formed while heating the phosphor raw material at a temperature which is at least 20° C. higher than the melting point (705° C.) of $EuBr_2$.

When vacuum evaporation is carried out using, as raw materials, double salt crystals which form $(Cs_a, Eu_b)Br_x$ (wherein a+b=x), in the same manner as above, the aforesaid raw materials are heated at a temperature which is at least higher 20° C. than the melting point of $EuBr_2$ to form vapor. Therefore, it is preferable that during vaporization, the layer forming rate is preferably at least 20 $\mu$m/minute, and is most preferably at least 60 $\mu$m/minute.

However, it is impossible to desirably control the vapor generation amount only employing the thermal control depending on the aforesaid melting point. As a result, crystals formed on a substrate do not result in columnar, uniform needle crystals, whereby the resulting phosphor does not exhibit sufficient enhancement in sharpness.

Accordingly, in the present invention, it is preferable that the melting point of the phosphor raw materials is controlled to a definite range by the addition of secondary activators Ce and Gd, and simultaneously, the vaporized amount is controlled while forming a stationary baffle between the vaporization source of the phosphor raw materials and the substrate so that the adhesion amount onto the substrate remains constant.

It is preferable that the aforesaid stationary baffle is provided to be parallel to both of the raw materials and the substrate and is formed so that the passage of vapor decreases at the central portion, while toward the edges it increases (for example, the number of openings at the edges is greater then in the central portion).

Further, the half-width of the emission wavelength of a phosphor is one of the factors which indicate a crystal state. Accordingly, a broad half-width results in distortion of the crystal form. On the other hand, to enhance sharpness, a narrow half-width preferably results in columnar crystals without distortion.

The emission wavelength of phosphors is determined using a common spectrophotometer.

It is preferable that the radiation image conversion panel of the present invention results in the photostimulable delayed fluorescence ratio of 0.0001 to 0.1 percent 300 milliseconds after X-ray exposure and also results in the instantaneously emitted delayed-luminescence ratio of 0.0001 to 0.01 percent 300 milliseconds after X-ray exposure. In such ranges, it is possible to obtain a radiation image conversion panel exhibiting the desired contrast.

The stimulable phosphors represented by aforesaid Formula (1), which are preferably employed in the present invention, will now be described.

In the stimulable phosphors represented by aforesaid Formula (1), $M^1$ is at least one alkaline metal atom selected from the group consisting of Li, Na, K, Rb, and Cs. Of these, at least one alkaline metal atom selected from Rb and Cs is preferred and Cs is more preferred.

$M^2$ represents at least one divalent metal atom selected from the group consisting of Be, Mg, Ca, Sr, Ba, Zn, Cd, Cu, and Ni. Of these, preferably employed are divalent metal atoms selected from the group consisting of Be, Mg, Ca, Sr, and Ba.

$M^3$ represents at least one trivalent metal atom selected from the group consisting of Sc, Y, La, Ce, Pr, Nd, Pm, Sm, Eu, Gd, Tb, Dy, Ho, Er, Tm, Yb, Lu, Al, Ga and In. Of these, preferably employed are trivalent metal atoms selected from the group consisting of Y, Ce, Sm, Eu, Al, La, Gd, Lu, Ga, and In.

A represents at least one metal atom selected from the group consisting of Eu, Tb, In, Ce, Tm, Dy, Pr, Ho, Nd, Yb, Er, Gd, Lu, Sm, Y, Tl, Na, Ag, Cu, and Mg.

From the viewpoint of enhancing the luminance of photostimulated luminescence of the stimulable phosphors, X, X', and X" each represents at least one halogen atom selected from the group consisting of F, Cl, Br, and I. Of these, preferred is at least one halogen atom selected from the group consisting of F, Cl, and Br. Further, of these, preferred is at least halogen atom selected from Br and I.

The stimulable phosphors represented by aforesaid Formula (1) are produced employing, for example, the production method described below.

Initially, as raw materials of phosphors, while stirring, acids (HI, HBr, HCl, and HF) are mixed with carbonates to achieve the composition described below. Subsequently, at the neutralization point, filtration is carried out. Thereafter, water in the resulting filtrate is vaporized to form crystals described below.

Raw materials of phosphor are as follow:

(a) At least one compound selected from the group consisting of NaF, NaCl, NaBr, NaI, KF, KCl, KBr, KI, RbF, RbCl, RbBr, RbI, CsF, CsCl, CsBr, and CsI is employed.

(b) At least one compound selected from the group consisting of $MgF_2$, $MgCl_2$, $MgBr_2$, $MgI_2$, $CaF_2$, $CaCl_2$, $CaBr_2$, $CaI_2$, $SrF_2$, $SrCl_2$, $SrBr_2$, $SrI_2$, $BaF_2$, $BaCl_2$, $BaBr_2$, $BaBr_2 \cdot 2H_2O$, $BaI_2$, $ZnF_2$, $ZnCl_2$, $ZnBr_2$, $ZnI_2$, $CdF_2$, $CdCl_2$, $CdBr_2$, $CdI_2$, $CuF2$, $CuCl_2$, $CuBr_2$, $CuI_2$, $NiF_2$, $NiCl_2$, $NiBr_2$, and $NiI_2$ is employed.

(c) In aforesaid Formula (1), compounds are employed which have a metal atom selected from the group consisting of Eu, Tb, In, Cs, Ce, Tm, Dy, Pr, Ho, Nd, Yb, Er, Gd, Lu, Sm, Y, Tl, Na, Ag, Cu, and Mg.

In the compound represented by Formula (1), "a" is a number satisfying the condition of $0 \leq a < 0.5$, and is preferably a number satisfying the condition of $0 \leq a < 0.01$; "b" is a number satisfying the condition of $0 \leq b < 0.5$, and is preferably a number satisfying the condition of $0 \leq b < 10^{-2}$; and "e" is a number satisfying the condition of $0 \leq e < 0.2$, and is preferably a number satisfying the condition of $0 \leq e < 0.1$.

Raw materials of phosphors of aforesaid (a) through (c) are mixed so as to achieve a mixing composition to satisfy the aforesaid conditions and are dissolved in water.

In such a case, the aforesaid raw materials may well be blended employing a mortar, a ball mill, or a mixer mill.

Subsequently, pH value C of the resulting aqueous solution is adjusted to satisfy the condition of $0 < C < 7$ by adding the specified acid. Thereafter, water is removed by evaporation.

Subsequently, the resulting raw material mixture is charged into a heat resistant container such as a quartz crucible or an alumina crucible and is fired in an electric furnace. The temperature for the firing is preferably from 500 to 1,000° C. The firing period differs depending on the charged amount of the raw material mixture and the temperature for the firing, but is preferably from 0.5 to 6 hours.

As the firing atmosphere, there can preferably be employed a weak reducing atmosphere such as a nitrogen gas atmosphere containing a small amount of hydrogen gas or a carbon dioxide atmosphere containing a small amount of carbon monoxide, a neutral atmosphere such as a nitrogen gas atmosphere or a an argon gas atmosphere, or a weak acidic atmosphere containing a small amount of oxygen gas.

After carrying out firing under the aforesaid conditions, a fired product is removed from the electric furnace and ground into a powder. Thereafter, the fired product powder is placed in a heat resistant container which is placed in an electric furnace and is fired again under the same firing conditions as above, whereby it is possible to enhance emission luminance of the resulting phosphor. Further, when a fired product is cooled from the firing temperature to room temperature, it is possible to prepare the desired phosphor in such a manner that after removing a fired product from the electric furnace, the fired product is air cooled while allowed to stand. However, cooling may be carried out under a weak reduction atmosphere equal to that during firing or a neutral atmosphere. Further, it is possible to further enhance the luminance of photostimulated luminescence of the phosphor by rapidly cooling the fired product under a weak reduction atmosphere, a neutral atmosphere, or a weak acidic atmosphere, while conveying the fired product from a heating section to a cooling section in the electric furnace.

Further, the stimulable phosphor layer of the present invention is formed employing a vapor phase method.

Employed as vapor phase methods of the stimulable phosphor may be a vacuum evaporation method, a sputtering method, a CVD method, and an ion plating method.

In the present invention, are listed are, for example, the methods described below.

In the first listed vacuum evaporation method, initially a support is placed in a vacuum evaporation apparatus which is then evacuated to result in a degree of vacuum of approximately $1.333 \times 10^{-4}$ Pa.

Subsequently, at least one of the aforesaid stimulable phosphors is thermally evaporated employing a method such as a resistance heating method or an electron beam method so that a stimulable phosphor layer having the desired thickness is grown on the surface of the aforesaid support.

As a result, a stimulable phosphor layer which comprises no binders is formed. During the aforesaid vacuum evaporation process, it is possible to form the stimulable phosphor layer while employing a plurality of vacuum evaporations.

Further, during the aforesaid vacuum evaporation process, it is possible to synthesize the target stimulable phosphor on a support and simultaneously to form a stimulable phosphor layer while carrying out co-vacuum evaporation, employing a plurality of resistance heating devices or electron beams.

After vacuum evaporation, if desired, a protective layer is provided on the side opposite the support side of the aforesaid stimulable phosphor layer, whereby the radiation image converting panel of the present invention is produced. Incidentally, steps may be taken in which after forming a stimulable phosphor layer on a protective layer, a support is provided.

Further, in the aforesaid vacuum evaporation method, during vacuum evaporation, if desired, a vacuum evaporating body (such as a support, a protective layer, or an interlayer) may be either cooled or heated.

Still further, after vacuum evaporation, the resulting stimulable phosphor layer may be subjected to a thermal process. In addition, if desired, reactive vacuum evaporation may be carried out while introducing gas such as $O_2$ or $H_2$.

In the sputtering method, described as the second method, in the same manner as the vacuum evaporation method, a support, having a protective layer or an interlayer, is placed in a sputtering apparatus. Subsequently, the apparatus is temporarily evacuated to result in a degree of vacuum of approximately $1.333 \times 10^{-4}$ Pa. Thereafter, inert gas, such as Ar or Ne is introduced into the sputtering apparatus as a sputtering gas to result in a gas pressure of approximately $1.333 \times 10^{-1}$. Subsequently, by carrying out sputtering, employing the aforesaid stimulable phosphor as a target, a stimulable phosphor layer is allowed to grow on the aforesaid support to reach the desired thickness.

In the aforesaid sputtering process, it is possible to use various types of application processes in the same way as the vacuum evaporation method.

The third method includes the CVD method, and the fourth method includes the ion plating method.

The growth rate of the stimulable phosphor layer in the aforesaid vapor phase growth is preferably from 0.05 to 300 $\mu$m/minute. It is not preferable that the growth rate is less than 0.05 $\mu$m/minute because productivity of the radiation image converting panel of the present invention is degraded. It is also not preferable that the growth rate exceeds 300 $\mu$m/minute because it is difficult to control the growth rate.

When radiation image converting panels are prepared employing the aforesaid vacuum evaporation method or sputtering method, it is possible to increase packing density of a stimulable phosphor with an absence of binders. Thereby, radiation image converting panels are preferably prepared which exhibit desired speed and resolving power.

The thickness of the aforesaid stimulable phosphor layer varies depending on the purpose of the radiation image converting panel and the type of stimulable phosphors. In order to exhibit the desired effects of the present invention, the aforesaid thickness is customarily from 50 $\mu$m to 1 mm, is preferably from 50 to 300 $\mu$m, is more preferably from 100 to 300 $\mu$m, and is most preferably from 150 to 300 $\mu$m.

While preparing a stimulable phosphor layer employing the aforesaid vapor phase growth method, the temperature of the support, on which the stimulable phosphor layer is formed, is preferably set at more than or equal to 100° C., is more preferably set at more than or equal to 150° C., and is most preferably set at 150 to 400° C.

Further, from the viewpoint of preparing a radiation image converting panel exhibiting high sharpness, the reflectance of the stimulable phosphor layer of the present invention is customarily at least 20 percent, is preferably at least 30 percent, and is more preferably at least 40 percent. Obviously, the upper limit is 100 percent.

Further, fillers such as binders may be placed into gaps between columnar crystals to reinforce the stimulable phosphor layer. In addition, high light-absorbing materials as well as high reflectance materials may also be used as a filler, which exhibit reinforcing effects and are effective to decrease light diffusion in the lateral direction of the stimulating light incident to the stimulable phosphor layer.

The formation of the stimulable phosphor layer of the present invention will now be described with reference to FIGS. 1 and 2.

Figure 1:
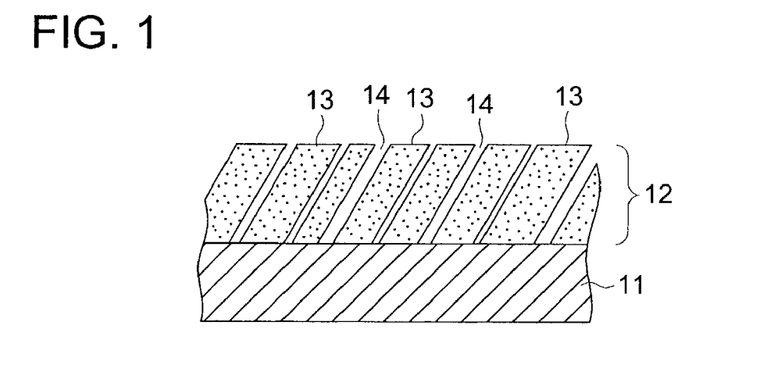
FIG. 1 is a schematic cross-sectional view showing one example of a stimulable phosphor layer having columnar crystals formed on a support.

FIG. 1 is a schematic cross-sectional view showing one example of a stimulable phosphor layer having columnar crystals formed on a support, employing the aforesaid vapor phase method. Numeral 11 is a support, 12 is a stimulable phosphor layer, and 13 is a columnar crystal which constitutes the aforesaid stimulable phosphor layer. Incidentally, 14 is a gap formed between columnar crystals.

Figure 2:
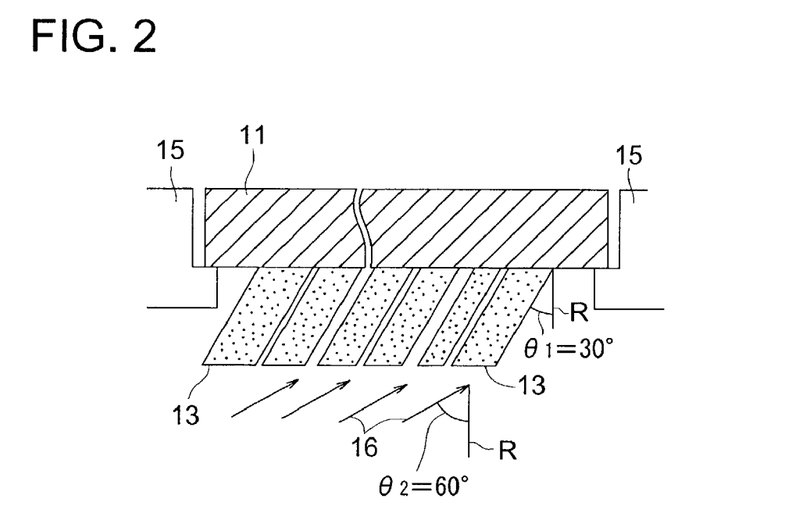
FIG. 2 is a view of how a stimulable phosphor layer is formed on a support employing a vacuum evaporation method.

FIG. 2 is a view showing how a stimulable phosphor layer is formed on a support employing vacuum evaporation. When the incident angle of stimulable phosphor vapor flow 16 with respect to normal direction (R) on the support surface is represented by θ2 (in FIG. 2, the incident angle is assumed to be 60 degrees), the angle of formed columnar crystal with respect to normal direction (R) on the support surface is represented by θ1 (in FIG. 2, approximately 30 degrees, being empirically one half), and the columnar crystals are formed while maintaining this angle.

Since the stimulable phosphor layer, formed as above on a support, comprises no binders, it exhibits high directivity. As a result, stimulating light and photostimulated luminescence also exhibit high directivity. Thereby, it is possible to increase the layer thickness compared to the radiation image converting panel having a dispersion type stimulable phosphor layer which is prepared by dispersing the stimulable phosphor into a binder. Further, it is possible to enhance sharpness due to a decrease in scattering of the stimulating light in the stimulable phosphor layer.

Further, the space between columnar crystals may be filled with fillers such as binders to reinforce the resulting stimulable phosphor layer. In addition, high light-absorbing materials as well as high reflectance materials may also be used as fillers. Such fillers result in the aforesaid reinforcing effects, and in addition, are effective to decrease diffusion in the lateral direction of stimulating light incident to the stimulable phosphor layer.

High reflectance materials, as described herein, refer to materials which result in high reflectance against the stimulating light (having a wavelength of 500 to 900 nm, and especially a wavelength of 600 to 800 nm). Employed as such materials may be, for example, metals such as aluminum, magnesium, silver, and indium, white pigments, and colorants in the green to red range. White pigments are capable of reflecting photostimulated luminescence.

Examples of white pigments include $TiO_2$ (including an anatase type as well as a rutile type), MgO, $PbCO_3$, $Pb(OH)_2$, $BaSO_4$, $Al_2O_3$, $M_{(xx)}FX$ (wherein $M_{(xx)}$ is at least one atom selected from the group consisting of Ba, Sr, and Ca, and X is a Cl atom or a Br atom), $CaCO_3$, ZnO, $Sb_2O_3$, $SiO_2$, $ZrO_2$, lithopone ($BaSO_4 \cdot ZnS$), magnesium silicate, basic silicic sulfates, basic lead phosphates, and aluminum silicate.

These white pigments exhibit high covering power as well as a large refractive index. As a result, they easily diffuse photostimulated luminescence through its reflection and refraction, whereby it is possible to markedly increase the speed of the resulting radiation image converting panel.

Further, employed as high light-absorbing materials are, for example, carbon black, chromium oxide, nickel oxide, and iron oxide as well as blue colorants. Of these, carbon black absorbs the photostimulated luminescence.

Still further, the aforesaid colorants may be either organic or inorganic.

Employed as organic colorants may be, for example, Zapon Fast Blue 3G (manufactured by Hoechst AG), Estrol Brill Blue N-3RL (manufactured by Sumitomo Kagaku Co., Ltd.), D & C Blue No. 1 (manufactured by National Aniline), Spirit Blue (manufactured by Hodogaya Kagaku Kogyo Co., Ltd.), Oil Blue No. 603 (manufactured by Orient Co., Ltd.), Kiton Blue A (manufactured by Ciba-Geigy), Aizen Catholin Blue GLH (manufactured by Hodogaya Kagaku Kogyo Co., Ltd.), Lake Blue AFH (manufactured by Kyowa Sangyo Co., Ltd.), Primocyanine 6GX (manufactured by Inahata Sangyo Co., Ltd.)), Brillacid Green 6BH (manufactured by Hodogaya Kagaku Kogyo Co., Ltd.), Cyanine Blue BNRCS (manufactured by Toyo Ink Manufacturing Co., Ltd.), and Lionol Blue SL (manufactured by Toyo Ink Manufacturing Co., Ltd.).

Further, also listed as organic colorants are organic metal complex colorants such as Color Index Nos. 24411, 23160, 74180, 74200, 22800, 23154, 23155, 14401, 14830, 15050, 15760, 15707, 17941, 74220, 13425, 13361, 13220, 11836, 74140, 74380, 74350, and 74460.

Listed as inorganic colorants are ultramarine blue such as cobalt blue and cerulean blue, and inorganic pigments such as chrome oxide and $TiO_2$—ZnO—Co—NiO based pigments.

Further, the stimulable phosphor layer of the present invention may be provided with a protective layer.

The aforesaid protective layer may be formed by applying a protective layer coating composition directly onto the stimulable phosphor layer or a protective layer which is separately formed may be adhered onto the stimulable phosphor layer. Alternatively, a means may be employed in which the stimulable phosphor layer is formed on the protective layer which is separately formed.

Employed as materials for the protective layer are common materials for protective layers, such as cellulose acetate, nitrocellulose, polymethyl methacrylate, polyvinyl butyral, polyvinyl formal, polycarbonate, polyester, polyethylene terephthalate, polyethylene, polyvinylidene chloride, nylon, polytertafluorinated ethylene, polytrifluorinated-chlorinated ethylene, tetrafluorinated ethylene-hexafluorinated propylene copolymers, vinylidene chloride-vinyl chloride copolymers, and vinylidene chloride-acrylonitrile copolymers. Other than these, employed as the protective layer may be transparent glass substrates.

Further, the aforesaid protective layer may be formed while preparing a layer comprised of inorganic materials such as SiC, $SiO_2$, SiN, or $Al_2O_3$, employing a vacuum evaporation method or a sputtering method.

The thickness of the aforesaid protective layers is preferably from 0.1 to 2,000 μm.

Figure 3:
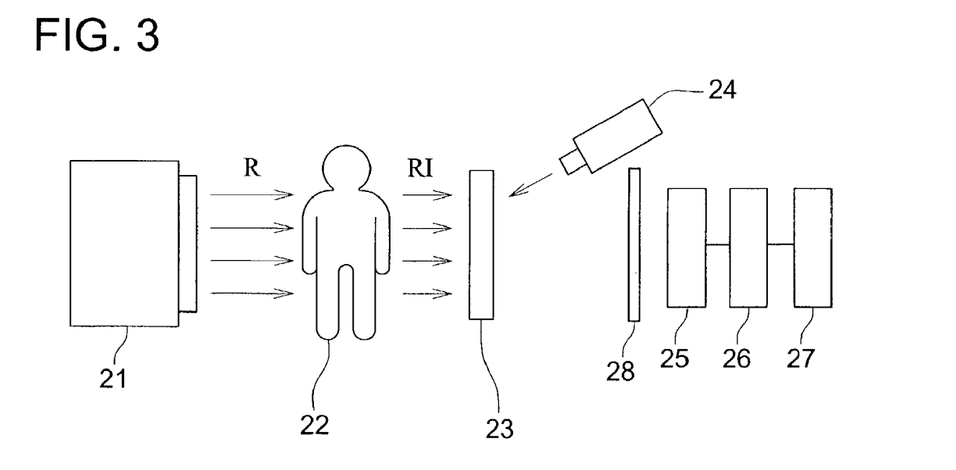
FIG. 3 is a schematic view showing one example of a constitution of the radiation image converting panel of the present invention.

FIG. 3 is a schematic view showing one example of the constitution of the radiation image converting panel of the present invention.

In FIG. 3, numeral 21 is a radiation generating apparatus, 22 is an object, 23 is a radiation image converting panel provided with a visible light and infrared radiation stimulable phosphor layer comprising stimulable phosphors, 24 is a stimulating light source which allows a radiation latent image of radiation image converting panel 23 to emit as photostimulated luminescence, 25 is a photoelectric conversion apparatus which detects the photostimulated luminescence emitted from radiation image converting panel 23, 26 is an image reproducing apparatus which reproduces photoelectric conversion signals detected by photoelectric conversion apparatus 25 as an image, 27 is an image display apparatus which displays the reproduced images, and 28 is a filter which eliminates reflection light form stimulating light source 24 and transmits only light emitted from radiation image converting panel 23.

Incidentally, FIG. 3 shows an example to obtain a radiation transmitted image of an object. However, when object 22 itself emits radiation, aforesaid radiation generating apparatus 21 is not particularly necessary.

Further, apparatuses following photoelectric conversion apparatus 25 may be any apparatuses as long as it is possible to reproduce light information from radiation image converting panel 23 to an image in any form, and are not limited to the foregoing.

As shown in FIG. 3, when object 22 is arranged between radiation generating apparatus 21 and radiation image converting panel 23 and then subjected to exposure of radiation R, radiation R is transmitted through object 22 in accordance with radiation transmittance of each portion of object 22. The resulting transmission image RI (i.e., the image formed depending on the intensity of radiation) is incident to radiation image converting panel 23.

The resulting incident transmission image RI is absorbed by the stimulable phosphor layer of radiation image converting panel 23, whereby the number of electrons and/or positive holes proportional to the radiation amount, which is absorbed by the stimulable phosphor layer, is generated. The resulting electrons and/or positive holes are stored in the trap level of the stimulable phosphor.

Namely, formed is a latent image which stores energy of a radiation transmission image. Subsequently, the resulting latent image is excited employing light energy so as to be visualized.

Further, the stimulable phosphor layer is exposed employing stimulating light source 24, which emits visible light or infrared radiation so that electrons and/or positive holes stored in the aforesaid trap level are expelled to release the stored energy as photostimulated luminescence.

The intensity of the aforesaid released photostimulated luminescence is proportional to the number of electrons and/or positive holes, i.e., the magnitude of radiation energy absorbed by the stimulable phosphor layer of radiation image converting panel 23. The resulting light signals are converted to electric signals, employing photoelectric conversion apparatus 25 such as a photomultiplier tube and are reproduced as an image, employing image reproduction apparatus 26. The reproduced image is then displayed employing image display apparatus 27.

Image reproduction apparatus 26 is more effectively employed when it is capable of carrying out so-called image processing, image operation, image memory and storage, other than reproduction of electric signals to image signals.

Further, due to the following reasons, it is preferable that photostimulated luminescence emitted from the stimulable phosphor layer has a spectrum distribution in the wavelength region which is as short as possible. During excitation employing light energy, it is necessary to separate the reflected light of stimulating light from photostimulated luminescence emitted from the stimulable phosphor layer. A photoelectric conversion unit commonly exhibits higher response to radiation energy of wavelength of less than or equal to 600 nm.

The emission wavelength region of the stimulable phosphor of the present invention is from 300 to 500 nm. On the other hand, the stimulating radiation wavelength ranges from 500 to 900 nm. As a result, the aforesaid conditions are simultaneously satisfied. Recently, the overall size of diagnostic apparatuses has decreased. As a result, semiconductor lasers, which are easily subjected to a decrease in size, are preferred which result in higher output of radiation having the wavelength employed for reading out images of the radiation image converting panel. The wavelength of the laser beam is preferably 680 nm. When excitation radiation having a wavelength of 680 nm is used, the stimulable phosphor arranged in the radiation image converting panel of the present invention exhibits excellent sharpness.

Namely, all stimulable phosphors of the present invention emit radiation having a main peak of less than or equal to 500 nm. In addition, stimulating light is easily separated and the resulting emission well matches the spectral sensitivity of a radiation receiving device, whereby it is possible to increase the speed of the image receiving system.

Employed as a stimulating light source is a light source including the stimulating light wavelength of the stimulable phosphor used in radiation image converting panel 23. Specifically, the use of laser beams simplifies the optical system and increases the intensity of the stimulating light, whereby it is possible to enhance the efficiency of photostimulated luminescence, while achieving more preferred results.

Examples of lasers include He—Ne lasers, He—Cd lasers, Ar ion lasers, Kr ion lasers, $N_2$ lasers, YAG lasers and second higher harmonics thereof, ruby lasers, semiconductor lasers, various dye lasers, and metal vapor lasers such as a copper vapor laser. Commonly, preferred are continuously oscillating lasers such as He—Ne lasers and Ar lasers. In addition, when a single pixel scanning time and a pulse are synchronized, it is possible to use pulse oscillating lasers.

Further, when, by eliminating filter 28, the aforesaid separation is carried out employing a method utilizing the delay of the emission, as shown in Japanese Patent Publication Open to Public Inspection No. 59-22046, it is more preferable to use a pulse oscillating laser rather than a continuously oscillating laser which has been modulated.

Of the aforesaid various laser beam sources, semiconductor lasers are most preferably employed since they are small-sized, less expensive, and require no modifiers.

Filter 28 transmits photostimulated luminescence emitted from radiation image converting panel 23 and absorbs stimulating light. Accordingly, filter 28 is specified depending on the combination of wavelength of photostimulated luminescence of the stimulable phosphor incorporated in radiation image converting panel 23 and of stimulating light source 24.

For example, in the case of a practically preferable combination such as combination of a stimulating wavelength of 500 to 900 nm and a photostimulated luminescence wavelength of 300 to 500 nm, employed as filters may be, for example, violet to blue glass filters such as C-39, C-40, V-40, V-42, and V-44, produced by Toshiba Corp., 7-54 and 7-59, produced by Corning Incorporated, and BG-1, BG-3, BG-25, BG-37, and BG-38, produced by SpectroFilm. Further, when interference filters are used, it is possible to select and use filters having somewhat optional characteristics. Employed as photoelectric conversion apparatus 25 may be any of those such as photoelectric tubes, photomultiplier tubes, photodiodes, photo-transistors, solar cells, and photoconductive elements which are capable of converting the variation of light amount to electric signals.

EXAMPLES

The present invention will now be described with reference to examples. However, the embodiments of the present invention are not limited to these examples.

Example 1

<<Preparation of Radiation Image Converting Panel Samples 1 Through 10 (In Table 1, Described as Samples 1 Through 10)>>

Figure 4:
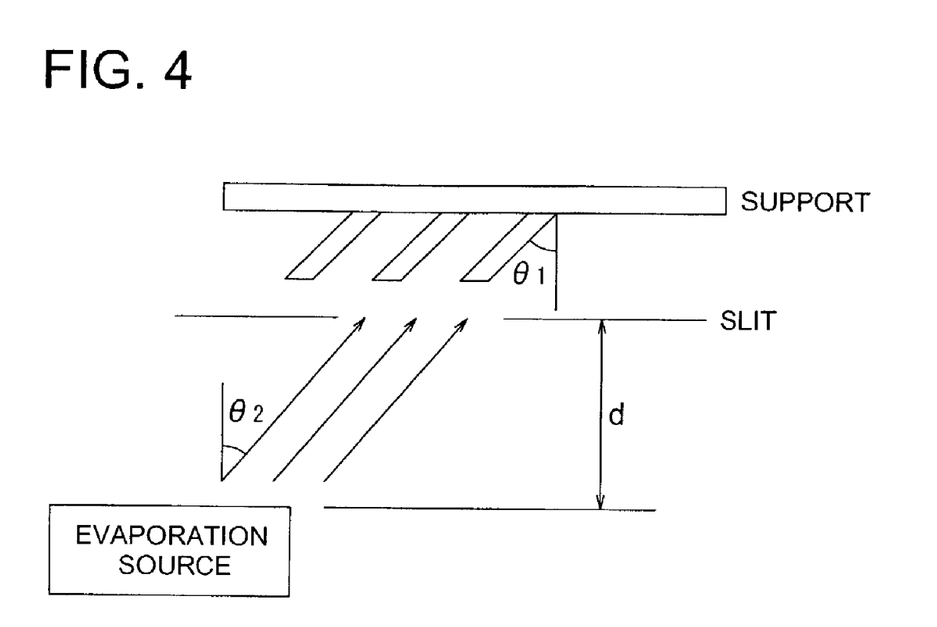
FIG. 4 is a schematic view showing one example of a method to prepare a stimulable phosphor layer on a support utilizing a vacuum evaporation.

Under conditions shown in Table 1, a stimulable phosphor layer comprising a stimulable phosphor (CsBr:Eu) was formed on the surface of a 200 micron thick crystalline glass (produced by Nippon Denki Glass Co.) support, employing a vacuum evaporation apparatus (however, θ1 and θ2 were set at 5 and 5 degrees, respectively) shown in FIG. 4.

Incidentally, vacuum evaporation was carried out using an aluminum slit. Distance d between the support and the slit was set at 60 cm. Vacuum evaporation was carried out while conveying the support in the direction parallel to the support so that the thickness of the stimulable phosphor layer was adjusted to 300 μm Further upon carrying out vacuum evaporation, the aforesaid support was placed in the vacuum evaporation unit. Subsequently a phosphor raw material (CsBr:Eu) as an evaporation source was subjected to press molding and was charged into a water-cooled crucible.

Thereafter, the vacuum evaporation unit was temporarily evacuated and then $N_2$ gas was introduced in it. After adjusting a degree of vacuum to 0.133 Pa, vacuum evaporation was carried out while maintaining support temperature (also called substrate temperature) at approximately 350° C. When the thickness of the stimulable phosphor layer reached 300 μm, vacuum evaporation was terminated. Subsequently the resulting phosphor layer was subjected to thermal processing at 400° C. Under an atmosphere of dry air at atmospheric pressure, a protective layer comprised of borosilicate glass was put on the phosphor layer and the peripheral portion of the support and the protective layer was sealed employing an adhesive, whereby Radiation Image converting Panel Sample 1 (Comparative Sample) was prepared in which the phosphor layer was sealed.

Each of Radiation Image converting Panel Samples 2 through 5 was prepared in the same manner as Radiation Image converting Panel 1 (Comparative Sample), except that the types of the flux in the phosphor raw materials, the amount of the flux, and the amount of the impurity in the phosphor layer were varied as shown in Table 1.

Radiation Image converting Panel Samples 1 through 10, prepared as above, were evaluated as described below.

Incidentally, the amounts of the alkaline metal and alkaline earth metal compounds (impurities) different from the stimulable phosphors in the phosphor layer which were employed as major components were those obtained by the aforesaid ICP method.

<<Evaluation of Sharpness>>

The modulation transfer function (MTF) of each Radiation Image converting Panel Sample was obtained and sharpness of each Sample was then evaluated.

The aforesaid MTF was determined as described below. A CTF chart was pasted on each of Radiation Image converting Panel Samples. Thereafter, the resulting Radiation Image converting Panel Sample was irradiated with X-rays at 80 kVp in an amount of 10 mR (the distance to the object was 1.5 m). Subsequently, the resulting CTF chart was subjected to scanning reading, utilizing a 100 μmϕ semiconductor laser beam (having a wavelength of 680 nm and a power of 40 mW on the panel). Each MTF value in Table 1 shows the total value (in percent) of 2.01 p/mm MTF values. Table 1 shows the results.

<<Evaluation of Luminance and Luminance Distribution>>

Luminance was evaluated by Regius 350, produced by Konica Corporation.

In the same manner as the evaluation of sharpness, irradiation of X-rays generated by a tungsten bulb, operated at 80 kVp and 10 mAs, was carried out, while maintaining the distance between the radiation source and a plate at 2 m. Thereafter, reading was carried out employing Regius 350 which was arranged at the plate. Evaluation was then carried out based on the electric signals from the photomultiplier tube.

An electric signal distribution from the photomultiplier tube within the image-captured plane was subjected to relative evaluation to obtain the standard deviation which was designated as the luminance distribution (S.D.) of each Sample. The less the value, the better the uniformity of the activator.

TABLE 1

| Sample | Type of Flux | Flux Proportion (ppm) | Impurity Proportion (ppm) in Layer | Degree of Vacuum | Luminance | MTF (21 p/mm) (percent) | Luminance Distribution S.D. | Remarks |
|---|---|---|---|---|---|---|---|---|
| 1 | none | — | — | $1.0 \times 10^{-3}$ | 0.120 | 30 | 18 | Comp. |
| 2 | KBr | 300 | 12.5 | $1.0 \times 10^{-3}$ | 1.820 | 31 | 10 | Inv. |
| 3 | KBr | 300 | 40.0 | $1.0 \times 10^{-6}$ | 1.430 | 33 | 7 | Inv. |
| 4 | KBr | 600 | 58.0 | $1.0 \times 10^{-3}$ | 1.250 | 26 | 7 | Inv. |
| 5 | KBr | 1000 | 234 | $1.0 \times 10^{-3}$ | 1.330 | 38 | 5 | Inv. |
| 6 | $NH_4Br$ | 300 | 154 | $1.0 \times 10^{-3}$ | 1.670 | 33 | 8 | Inv. |
| 7 | $NH_4Br$ | 1000 | 483 | $1.0 \times 10^{-3}$ | 1.310 | 32 | 6 | Inv. |
| 8 | NaBr | 300 | 112 | $1.0 \times 10^{-3}$ | 1.420 | 33 | 4 | Inv. |
| 9 | KBr | 5000 | 1267 | $1.0 \times 10^{-3}$ | 0.002 | 8 | 6 | Comp. |
| 10 | $NH_4Br$ | 1200 | 5700 | $1.0 \times 10^{-3}$ | 0.016 | 12 | 8 | Comp. |

Comp.; Comparative Example
Inv.; Present Invention
In Table,
Flux: flux in phosphor materials
In Layer: in the phosphor layer As can clearly be seen from Table 1, samples of the present invention were superior to Comparative Samples.

As practically proved in Examples 1 to 10, the radiation image converting panel and the production method of the aforesaid radiation image converting panel result in excellent uniformity of activators in the phosphor layer and exhibit excellent effects such as high luminance as well as high sharpness.

Example 2

<<Preparation of Radiation Image Converting Panel Samples 11 Through 15 (In Table 2, Described as Samples 11 through 15)>>

Under conditions shown in Table 2, a stimulable phosphor layer comprising a stimulable phosphor (CsBr:Eu) was formed on the surface of a 1 mm thick crystalline glass (produced by Nippon Denki Glass Co.) support, employing the vacuum evaporation apparatus (however, θ1 and θ2 were set at 15 and 5 degrees, respectively) shown in FIG. 4.

The vacuum evaporation apparatus shown in FIG. 4 was employed. In addition, an aluminum slit was used. Distance d between the support and the slit was set at 60 cm. Vacuum evaporation was carried out while conveying the support in the direction parallel to the support so that the thickness of the stimulable phosphor layer was regulated to 300 μm.

Incidentally, upon carrying out vacuum evaporation, the aforesaid support was placed in the vacuum evaporation unit. Subsequently the raw materials of phosphor (CsBr:Eu) were placed on a vacuum evaporation plate comprised of tungsten as a vacuum evaporation source, and vacuum evaporation was carried out through flowing electric current while controlling the temperature of the vacuum evaporation plate.

Thereafter, the vacuum evaporation unit was temporarily evacuated, and then $N_2$ gas was introduced in it. After adjusting the degree of vacuum to 0.133 Pa, vacuum evaporation was carried out while controlling the support temperature (also called substrate temperature) at approximately 350° C. When the thickness of the stimulable phosphor layer reached 300 μm, vacuum evaporation was terminated. Subsequently the resulting phosphor layer was subjected to thermal processing at 400° C. Under an ambience of dry air, the peripheral portion of the protective layer comprising the support and borosilicic acid glass was sealed employing an adhesive, whereby Radiation Image converting Panel Sample 11 (Comparative Sample) was prepared in which the phosphor layer was sealed.

Incidentally, during vacuum evaporation, the vacuum evaporation source was heated to 638° C.

Each of Radiation Image converting Panel Samples 12, 13, 14, and 15 was prepared in the same manner as Radiation Image converting Panel 11 (Comparative Sample), except that the conditions described in Table 2 were employed. Incidentally, was used $5\times10^{-4}$ g Eu, while was used $5\times10^{-4}$ g Gd.

Radiation Image converting Panel Samples 11 through 15, prepared as above, were evaluated as described below.

<<Evaluation of Luminance>>

Luminance was evaluated using a Regius 350, produced by Konica Corporation.

Irradiation of X-rays generated by a tungsten bulb, operated at 80 kVp and 10 mAs, was carried out in such a way that the distance between the radiation source and the plate was 2 m. Thereafter, reading was carried out employing aforesaid Regius 350 which was arranged on the plate. Relative evaluation was carried out based on the resulting electric signals from the photomultiplier tube. The luminescence of emission generated by Sample 12 was designated as 1.0 and the luminescence of emission generated by other samples was represented by a relative value.

<<Evaluation of Sharpness>>

The modulation transfer function (MTF) of each Radiation Image converting Panel Sample was obtained and sharpness of each Sample was then evaluated.

The aforesaid MTF was determined as described below. A CTF chart was pasted on each of Radiation Image converting Panel Samples. Thereafter, the resulting Radiation Image converting Panel Sample was irradiated with X-rays at 80 kVp in an amount of 10 mR (the distance to the object was 1.5 m). Subsequently the resulting CTF chart was subjected to scanning reading, utilizing a 100 μmφ semiconductor laser beam (having a wavelength of 680 nm and a power of 40 mW on the panel). Each MTF value in Table 1 shows the total value (in percent) of 2.01 p/mm MTF values. Table 2 shows the results.

<<Measurement of Instantaneous Delayed Luminescence Ratio as well as Photostimulated Delayed Luminescence Ratio>>

Evaluation Method

In the same way as the evaluation of luminance, photostimulated luminescence was measured upon reading signal values.

The photostimulated delayed luminescence ratio was determined as follows: Laser scanning was carried out during one half of the original laser scanning period. After scanning, luminance value (Ea) was determined. When the scanning was carried out during one half of the original laser scanning period, the laser generating unit was turned off. Subsequently, luminance value (Eb) was measured 300 milliseconds after turning off the laser generating unit. The photostimulated delayed luminescence ratio was then obtained based on the formula below.

Photostimulated delayed luminescence ratio (percent)
=(Ea/Eb)×100

Under a constitution of X-rays/plate/photomultiplier tube (R1305, produced by Hamamatsu Photonics Co.), signal (E1) was measured 300 milliseconds after X-ray irradiation while the signal, immediately after X-ray irradiation, was designated as E0. The instantaneously emitted delayed-luminescence ratio was obtained based on the formula below.

Instantaneously emitted delayed-luminescence ratio
(percent)=(E1/E0)×100

<<Measurement of Half-Width of Emission Wavelength>>

The wider half-width deteriorates crystallinity, while the narrower half-width results in columnar crystals without deteriorating crystallinity, whereby excellent sharpness is obtained.

Incidentally, figures below activator Eu in Table 2 show the heating temperature of evaporation source during vacuum evaporation.

TABLE 2

| Sample | Content | | | Luminance | MTF (21 p/mm) percent | Instantaneously Emitted Delayed Luminescence (percent) | Photostimulated Delayed Luminescence (percent) | Half-Width of Emission Wavelength nm | Remarks |
|---|---|---|---|---|---|---|---|---|---|
| | Primary Activator | Secondary Activator 1 | Secondary Activator 2 | | | | | | |
| 11 | Eu 638 | — | — | 0.3 | 10 | 1.2 | 1.5 | 42 | Comp. |
| 12 | Eu 700 | Gd | — | 1.0 | 32 | 0.2 | 0.3 | 18 | Inv. |
| 13 | Eu 700 | Gd | Ce | 1.5 | 36 | 0.08 | 0.007 | 16 | Inv. |
| 14 | Eu 720 | Gd baffle | Ce | 2.1 | 33 | 0.007 | 0.003 | 8 | Inv. |
| 15 | Eu 740 | Gd baffle | Ce | 2.5 | 32 | 0.002 | 0.001 | 6 | Inv. |

Comp.; Comparative Example
Inv.; Present Invention

As proved practically in the examples 11 to 15, the radiation image converting panel and the production method of the aforesaid radiation image converting panel exhibit excellent effects in such a way that delayed luminescence is minimized, the half-width of emission wavelength is narrowed, and high sharpness is realized.

What is claimed is:

1. A radiation image converting panel comprising a support having thereon a stimulable phosphor layer produced by a vapor phase method so as to have a thickness of 50 μm to 1 mm,
    wherein the stimulable phosphor layer comprises a stimulable phosphor comprising at least two kinds of rare earth compounds each having a different rare earth element, and the rare earth compounds being uniformly present in the stimulable phosphor layer, and
    wherein a photostimulated delayed luminance ratio defined by Eb/Ea is 0.0001 to 0.1%:
    (i) Ea being a luminance of a photostimulated emission from the radiation image converting panel after being irradiated with X ray and subsequently being stimulated with a laser; and
    (ii) Eb being a luminance of the stimulated delayed emission from the radiation image converting panel at 300 msec after suspension of stimulation with the laser.

2. A radiation image converting panel of claim 1 wherein the stimulable phosphor is represented by Formula (1):

M'X·aM²X'₂·bM³X"₃: eA     Formula (1).

3. The radiation image converting panel of claim 1 wherein one of the two kinds of rare earth compounds comprises a Cs atom.

4. The radiation image converting panel of claim 1 wherein said stimulable phosphor is produced in a dry air condition to produce a protective layer on the stimulable phosphor layer.

5. A radiation image converting panel comprising a support having thereon a stimulable phosphor layer produced by a vapor phase method so as to have a thickness of 50 μm to 1 mm,
    wherein the stimulable phosphor layer comprises a stimulable phosphor comprising at least two kinds of rare earth compounds each having a different rare earth element, and the rare earth compounds being uniformly present in the stimulable phosphor layer, and
    wherein an instantaneous delayed luminance ratio defined by E1/E0 is 0.0001 to 0.1%:
    (i) E0 being a luminance of an emission from the radiation image converting panel at the moment of being irradiated with X ray; and
    (ii) E1 being a luminance of an emission from the radiation image converting panel at 300 msec after suspension of irradiation with X ray.

6. A radiation image converting panel of claim 5 wherein the stimulable phosphor is represented by Formula (1):

M'X·aM²X'₂·bM³X"₃:eA     Formula (1).

7. The radiation image converting panel of claim 5 wherein one of the two kinds of rare earth compounds comprises a Cs atom.

8. The radiation image converting panel of claim 5 wherein said stimulable phosphor is produced in a dry air condition to produce a protective layer on the stimulable phosphor layer.

* * * * *